(12) United States Patent
Braun et al.

(10) Patent No.: US 7,528,847 B2
(45) Date of Patent: May 5, 2009

(54) CONTENT EDITING PROTECTED VIEW

(75) Inventors: Owen C. Braun, Seattle, WA (US); David C. Tse, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 330 days.

(21) Appl. No.: 11/418,350

(22) Filed: May 4, 2006

(65) Prior Publication Data
US 2007/0260997 A1 Nov. 8, 2007

(51) Int. Cl.
*G09G 5/00* (2006.01)
(52) U.S. Cl. .................................. 345/619; 345/629
(58) Field of Classification Search .................. None
See application file for complete search history.

(56) References Cited

U.S. PATENT DOCUMENTS

| | | | | |
|---|---|---|---|---|
| 6,232,972 B1 | 5/2001 | Arcuri et al. | ................ | 345/352 |
| 6,308,199 B1 * | 10/2001 | Katsurabayashi | ........... | 709/204 |
| 6,421,065 B1 | 7/2002 | Walden et al. | ............... | 345/712 |
| 6,826,727 B1 * | 11/2004 | Mohr et al. | .................. | 715/235 |
| 6,857,105 B1 | 2/2005 | Fox et al. | ..................... | 715/825 |
| 2006/0031779 A1 * | 2/2006 | Theurer et al. | .............. | 715/781 |

OTHER PUBLICATIONS

Microsoft Excel: Microsoft Office Assistance: Switch to full or normal screen view.
Mircosoft Word: Microsoft Office Assistance: Troubleshoot document views and screen displays.
Microsoft Internet Explorer, Customize Your Web Browsing Layout.

* cited by examiner

*Primary Examiner*—Ulka Chauhan
*Assistant Examiner*—Daniel F Hajnik
(74) *Attorney, Agent, or Firm*—Merchant & Gould; Ryan T. Grace

(57) ABSTRACT

A software application window shows current content in a content region and navigation information in a plurality of navigation regions, with the navigation regions showing contextual information for the current content, as well as for related content. A request to hide navigation information is received, and navigation information for related content is hidden from the window. Any space made available by the hidden content is used to expand the content region, while maintaining the same size and location of the software application window.

20 Claims, 7 Drawing Sheets

FIG. 5

CONTENT EDITING PROTECTED VIEW

BACKGROUND

Most software applications that enable document editing include window adornments which, while permitting quick access to functionality, can crowd the screen. This may leave minimal space for a document to be viewed and/or modified. In addition, for applications which include navigation adornments, there's a danger in allowing on-lookers to see navigation indicators which may inadvertently provide confidential or sensitive information. For example, in an application such as Microsoft's OneNote editing software, windows include navigation adornments such as notebook buttons, section tabs, and page tabs.

As an example of the problem outlined above, if a salesperson has OneNote open at a client meeting, the content of notebook, section, or page tabs may reveal notes regarding a direct competitor of the client. If the client looks over the salesperson's shoulder, the fact of her relationship with the competitor may prove damaging to the salesperson. Moreover, navigation and other forms of window adornments may lead to crowded or busy editing spaces, inappropriate for on-lookers or audiences.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments provide for receiving a request to hide navigation information displayed in a plurality of navigation regions within a window, each of the navigation regions showing navigation information for both current content and related content. Navigation information for related content in each of the navigation regions is hidden from view. Any available window space created is used to enlarge a content region showing current content, all while maintaining the window at the same size and location.

These and other features and advantages will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

The foregoing brief summary of the invention, as well as the following detailed description, is better understood when read in conjunction with the accompanying drawings, which are included by way of example, and not by way of limitation with regard to the claimed invention. In the accompanying drawings, the same or similar elements are labeled with the same reference numbers.

FIGS. 2-6 depict a window interface for a content editing application.

DETAILED DESCRIPTION

Document editing software may integrate functionality to quickly hide window adornments which may reveal sensitive or confidential information to on-lookers. Content editing applications may include software having content editing functionality including, but not limited to, word processors, note taking applications, presentation software, graphics editors, website editors, spreadsheets and so forth.

Figure 1:
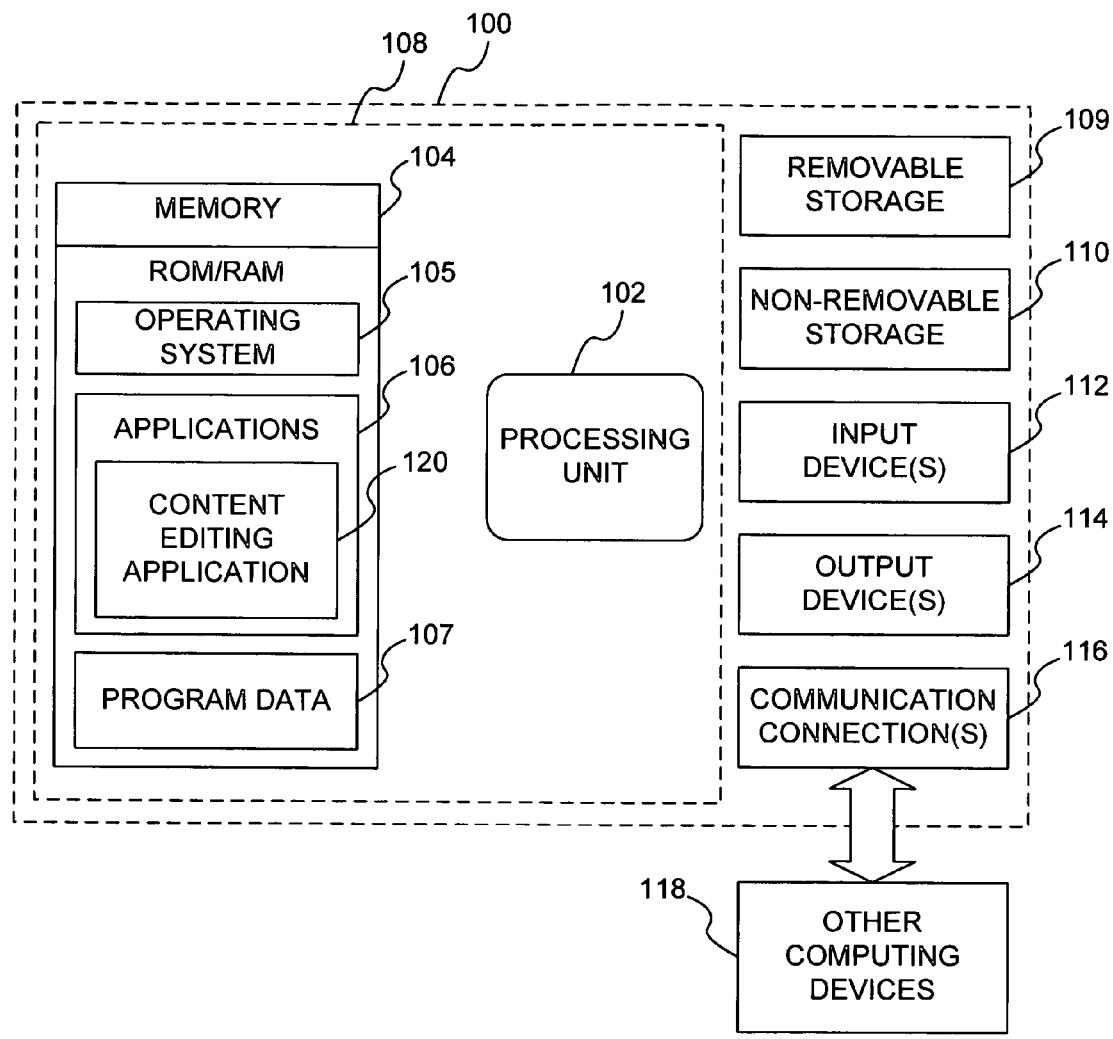
FIG. 1 depicts an exemplary computing operating environment.

With reference to FIG. 1, an embodiment may include a computing device, such as computing device 100. In a basic configuration, computer device 100 may include at least one processing unit 102, and memory 104. Depending on the configuration of the computer device, memory 104 may be volatile (e.g., Random Access Memory (RAM)), non-volatile (e.g., Read-Only Memory (ROM), Flash, etc.), or some combination thereof. Memory 104 may serve as a storage location for operating system 105, one or more applications 106, and may include program data 107, as well as other programs. In one embodiment, applications 106 may include content editing application 120.

Although the basic computing device configuration is contained within dashed-line box 108, computing device 100 may include additional features and functionality. For example, computing device 100 may include additional data storage components, including both removable storage 109 (e.g., floppy disks, memory cards, compact disc (CD) ROMs, digital video discs (DVDs), external hard drives, universal serial bus (USB) key drives, etc.) and non-removable storage 110 (e.g., magnetic hard drives).

Computer storage media may include media implemented in any method or technology for storage of information, including computer readable instructions, data structures, program modules, or other data. Memory 104, removable storage 109, and non-removable storage 110 are all examples of computer storage media. Further examples of such media include RAM, ROM, electrically-erasable programmable ROM (EEPROM), flash memory, CD-ROM, DVD, cassettes, magnetic tape, magnetic disks, and so forth. Any such computer storage media may be accessed by components which are a part of computing device 100, or which are external to computing device 100 and connected via a communications link (e.g., Bluetooth, USB, parallel, serial, infrared, etc.). Computing device 100 may also include input devices 112, such as keyboards, mice, pens, microphone, touchpad, touch-display, etc. Output devices 114 may include displays, speakers, printers, and so forth. Additional forms of storage, input, and output devices may be utilized.

Computing device 100 may also include one or more communication connections 116 which allow the computing device to communicate with other computing devices 118, such as over a network (e.g., a local area network (LAN), the Internet, etc.). Communication media, in the form of computer readable instructions, data structures, program modules, or other data in a modulated data signal, may be shared with and by device 100 via communication connection 116. Modulated data signal may mean a signal that has one or more of its characteristics set or changed in such a manner as to encode information in the signal, and may include a modulated carrier wave or other transport mechanism. Communication connection 116 may be comprised of hardware and/or software enabling either a wired (e.g., Ethernet, USB, Token Ring, modem, etc.) or wireless (e.g., WiFi, WiMax, cellular, acoustic, infrared, radio frequency (RF), etc.) communication conduit with other devices 118.

Figure 2:
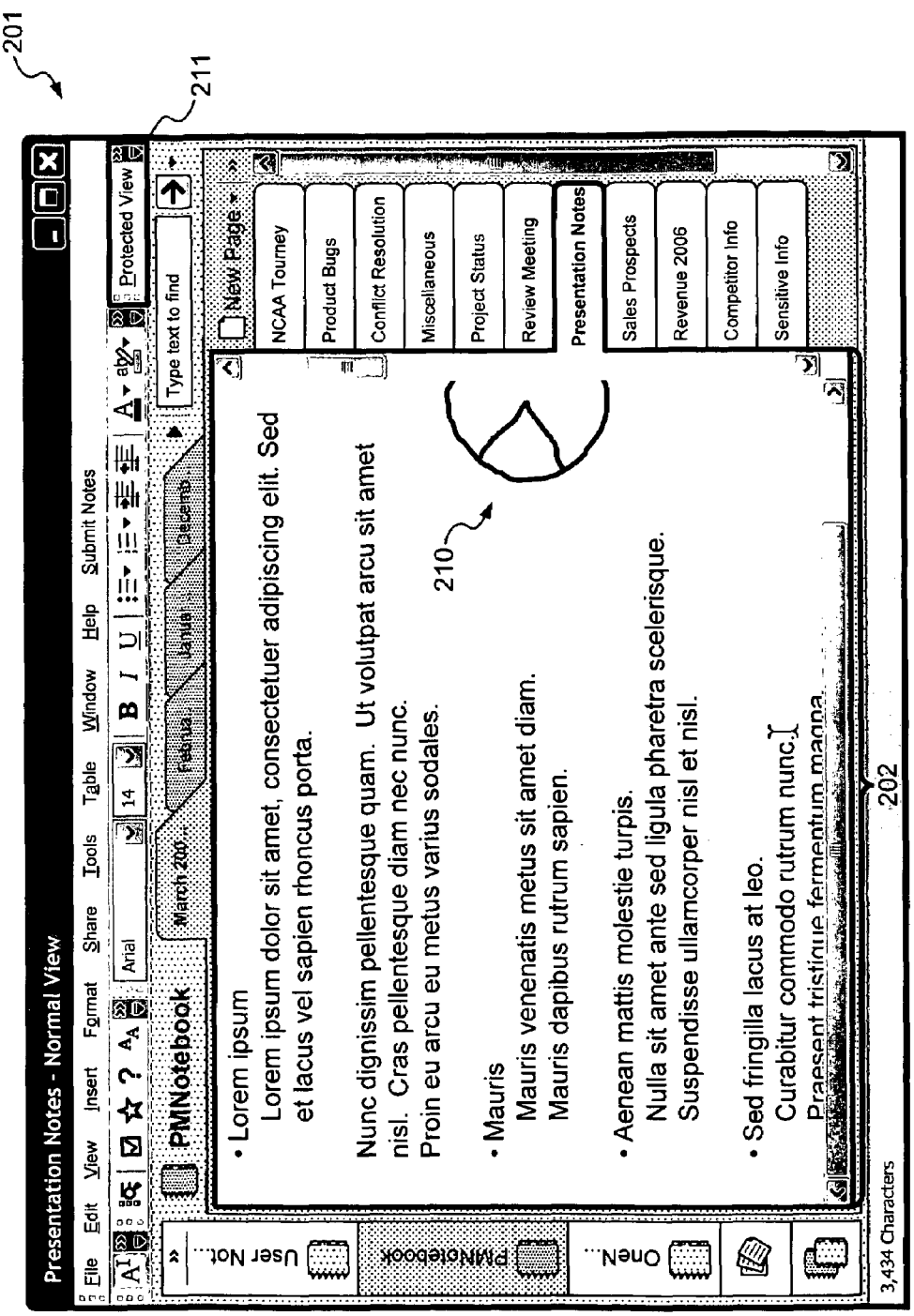

FIG. 2 depicts an example of a window 201 presenting an interface for content editing application 120. Content region 202 includes the portion of window 201 for reading and/or editing the current document. The document may include text, drawings, images, and so forth, including ink drawing 210. Because of the size of content region 202, only a portion of the document can be viewed, as evidenced by the partially hidden ink drawing 210. Window 201 may include "Protected View" button 211, whose use will be explained further down.

Figure 3:
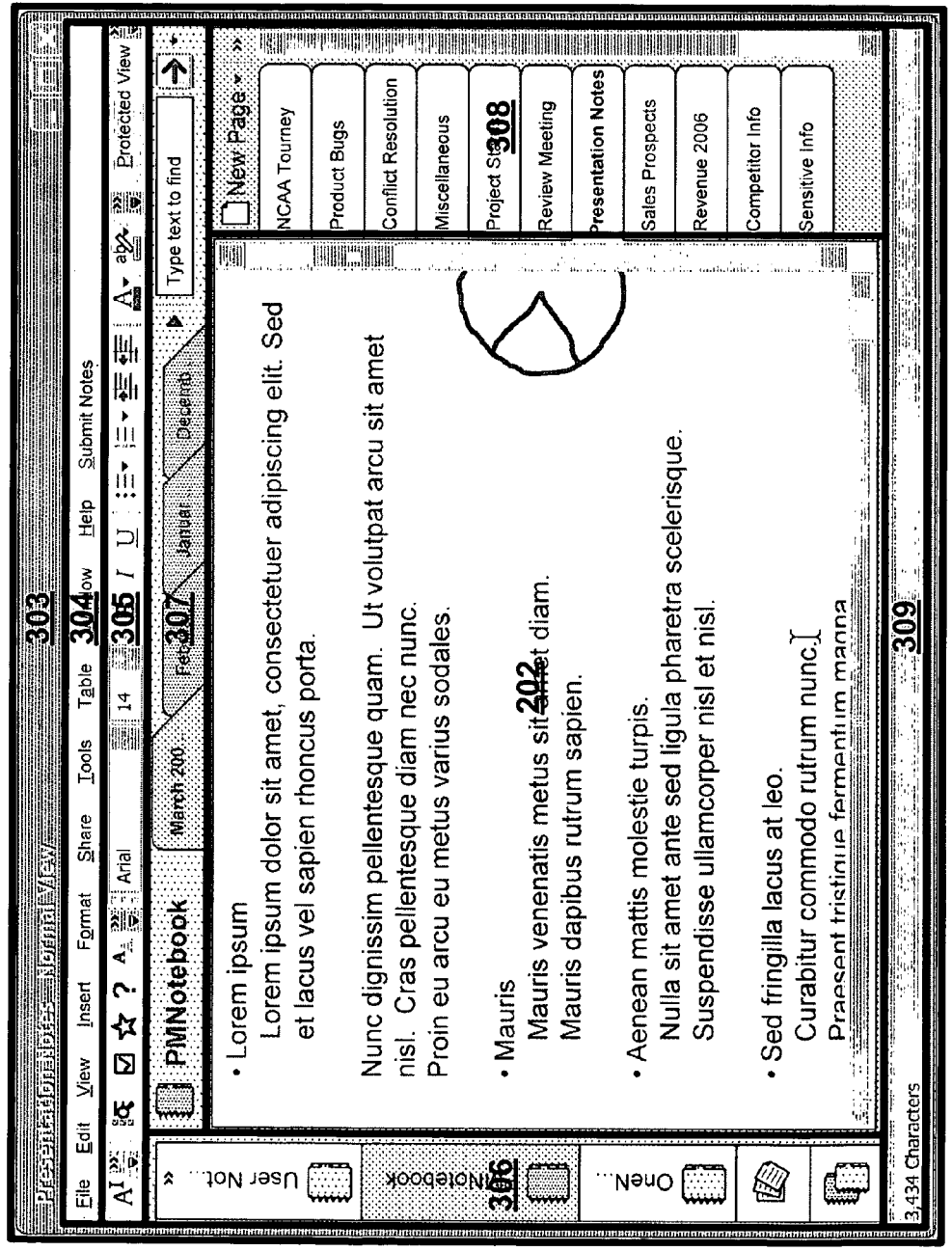

FIG. 3 depicts window 201 again having multiple window regions or adornments highlighted. In addition to content region 202, window 201 includes window frame 303, which may include window borders, window controls, and title. Menu bar 304 provides access to a broad array of functionality which may or may not be tailored for the individual user. Toolbar 305 also provides access to functionality, although more limited and more targeted typically than menu bar 304. Status bar 309 may provide additional information about content currently displayed or other status indicators.

Regions 306, 307, and 308 may be described as navigation regions. This subset of window adornments may provide a user with a context for the location or categorization of the current document. Notebook selection region 306 provides a selectable listing of notebooks recently opened and/or modified by a user. A notebook may be representative of a folder in a file system. Section tab region 307 may break down the content of a currently selected notebook into meaningful sections. A section may be representative of a file in a file system. A user may be able to review the tabs and click on one, causing content from the selected section to be revealed. Page tab region 308 may further subdivide the contents of a section into meaningful pages or bookmarks. Other window regions may be utilized, and those shown here may not be utilized depending on the particular software application and interface configuration.

Each of the three navigation regions 306, 307, and 308 may include information of a personal, confidential, inappropriate, or sensitive nature. For example, the currently selected section ("March 2006") includes content broken down in page tab region 308. This content includes tabs describing potentially personal ("NCAA Tourney"), sensitive ("Product Bugs"), and/or confidential ("Revenue 2006") information. Not only would a salesperson showing this window to a client not show the content associated with these tabs, but she may not want the client to see the tabs and know that the content is there. Just knowing that there are product bugs, for example, may affect a salesperson's ability to sell the product.

A user of content editing application 120 may wish to hide or obscure sensitive portions of navigation regions 306, 307, and 308, preventing sensitive information from being inadvertently seen. A user may also wish to hide navigation regions 306, 307, and 308 entirely. At the same time, a user may want the window frame 303 to maintain its current location and size so as to allow viewing of other on-screen information. Expanding the window frame 303 to encompass the whole screen and removing nearly all window adornments may not be what the user wishes to do. In addition, using interface controls to close each region or adornment individually may be unnecessarily time-consuming and cumbersome.

Figure 4:
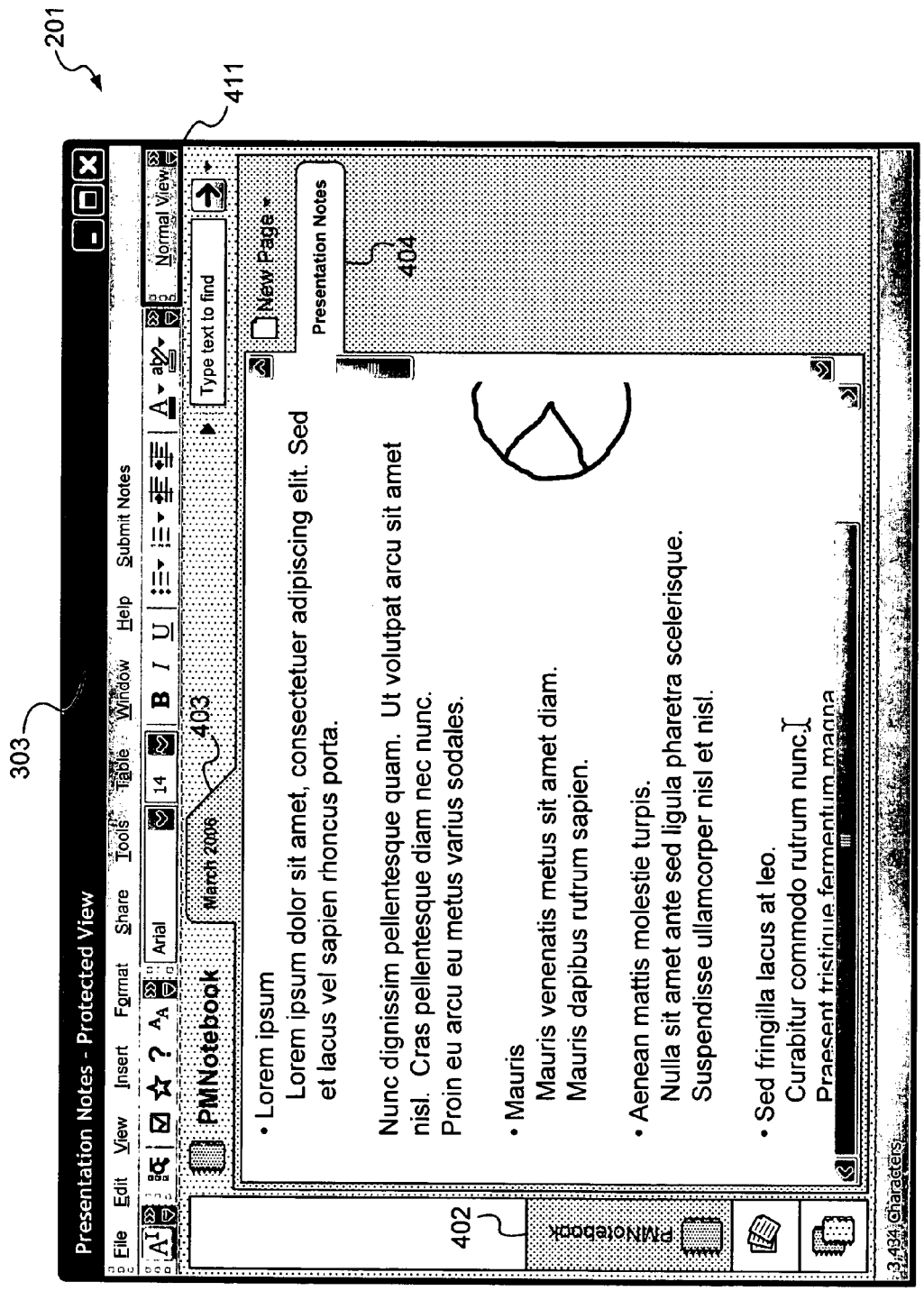

FIG. 4 depicts window 201 having protected navigation regions. Here, only the navigation components in context for the current content are shown in the navigation regions. This includes current notebook selector 402, current section tab 403, and current page tab 404. By hiding the tabs and selectors of related content (but not the current content), a user can protect the titles and/or descriptors of other documents and/or pages in his collection. Related content may encompass content which shares a file or folder location with current content, or shares other contextual information such as categorization, for example. Window frame 303, whether maximized in the window or not, maintains its shape and location, allowing a user to easily view or access window information, other windows, taskbars, and so forth. To enable protected view, a user may click "Protected View" button 211 from FIG. 2. Alternatively, a user may use a hot key or keyboard shortcut (e.g., the "F11" key), a menu item, or any other control or controls. By signaling a desire to "protect" the view, content editing application 120 may hide window or navigation components using programming calls to operating system 105. When converted to protected view as shown, "Protected View" button 211 may be replaced with "Normal View" button 411, which allows a user to return to the normal view, with hidden components made visible.

Figure 5:
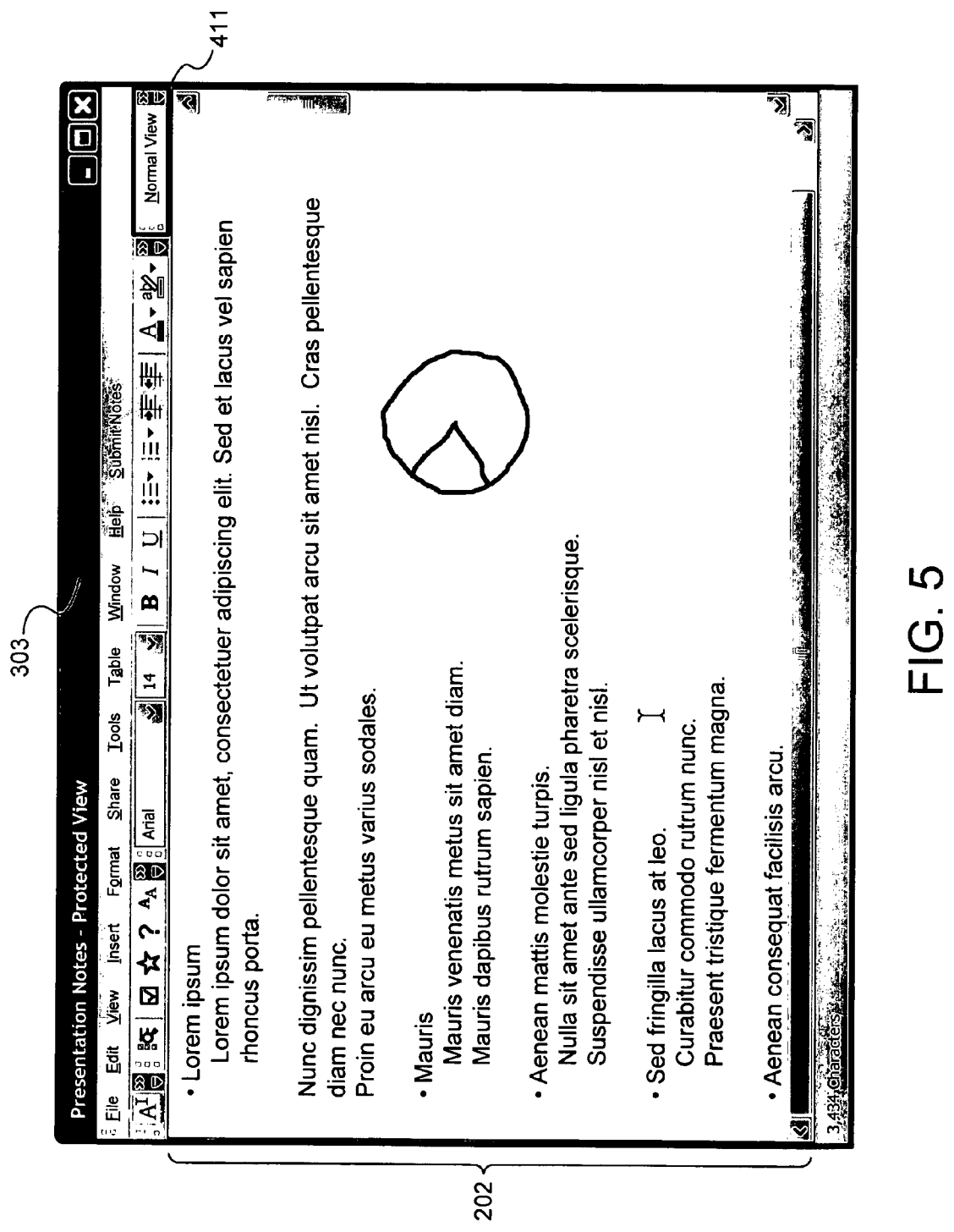

FIG. 5 depicts an additional embodiment of window 201 having protected navigation regions. Here, rather than only hide the non-contextual navigation elements, navigation regions 306, 307, and 308 have been entirely hidden, vastly expanding the area available to content region 202. Not only does this prevent a user from viewing potentially sensitive information, it also makes the screen appear less crowded and/or confusing for on-lookers. Window frame 303 retains its size and location, as above. Accessing this protected view may involve the use of a toolbar button, menu selection, hot key, keyboard shortcut, and so forth. As above, "Protected View" button 211 may be replaced with "Normal View" button 411.

Figure 6:
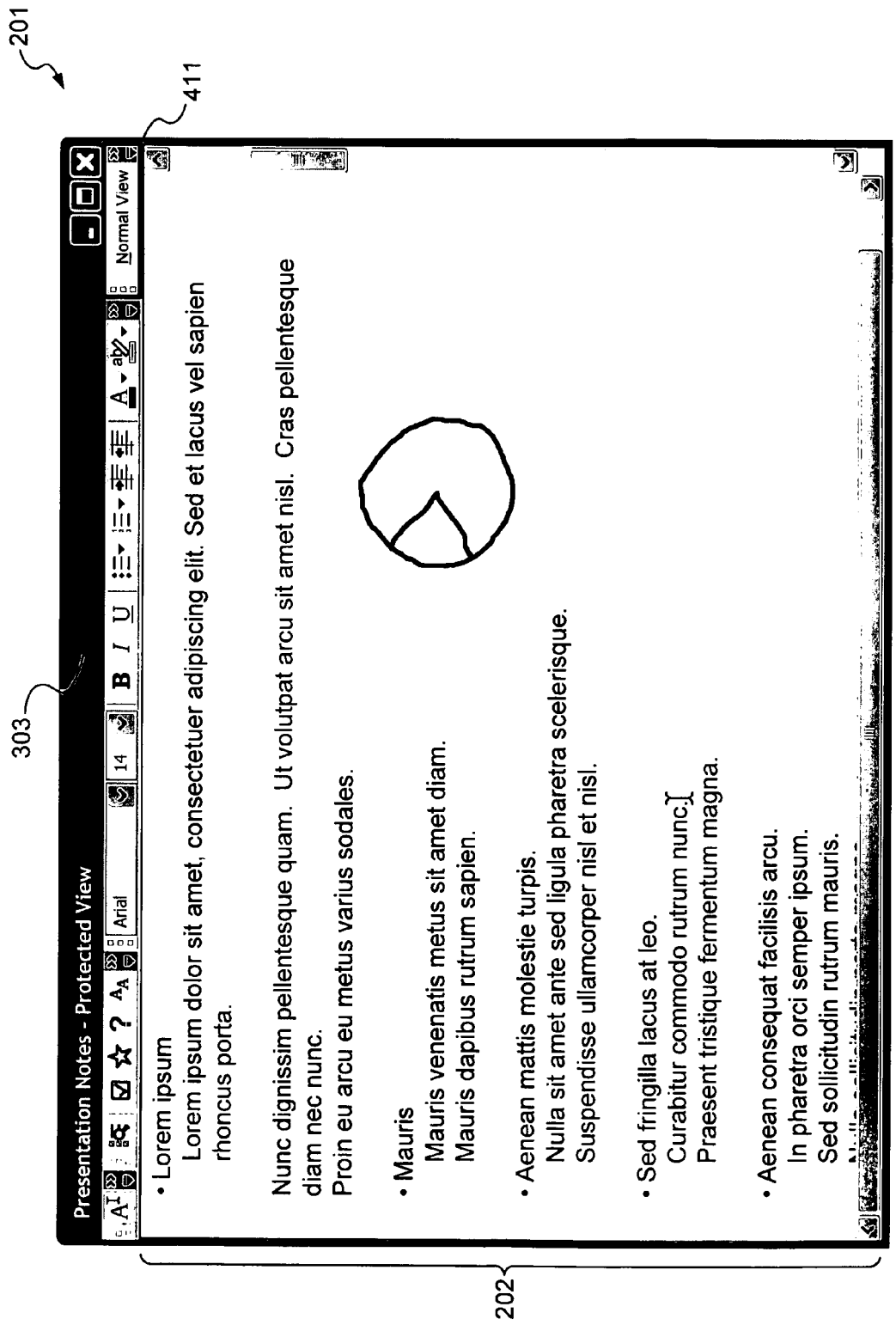

FIG. 6 depicts a third embodiment of window 201 having protected navigation regions. In addition to hiding the navigation regions as in FIG. 5, menu bar region 304 and status bar region 309 have also been hidden. This allows window 201 (with window frame 303 still retaining its same size and location) to be both protected and highly clutter-free, in addition to enlarging the editable/viewable space of content region 202. In addition to hiding the regions discussed, toolbar 305 may be modified so as to include the commands most relevant to the present operation, whether that may be drawing, entering text, writing words in electronic ink, and so forth. This may occur in order to replace any commonly used functionality from the now-hidden menu. As before, "Protected View" button 211 may be replaced with "Normal View" button 411.

Although shown as distinct embodiments, the three protected views shown need not be mutually exclusive. For example, a user may repeatedly press the hot key for protected view, and cycle through each of the protected views, such that pressing the hot key four times would cycle through each of the three alternatives and back to normal view. The embodiments of a protected view shown and described here are not intended to be the only possible forms of protected view. Other interfaces may utilize the concepts and methods described above.

Figure 7:
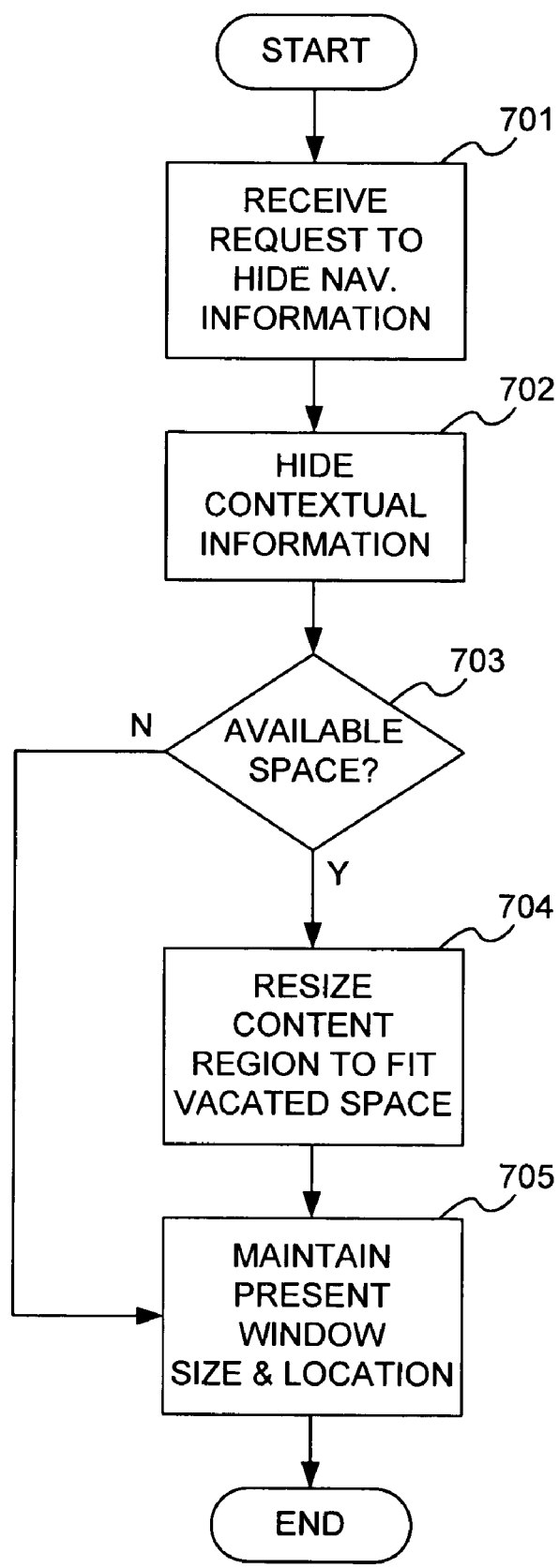
FIG. 7 depicts a method for creating a protected view in a content editing application.

FIG. 7 is a flow diagram depicting a method for creating a protected view. At 701, a software application receives a request to protect the view in the current window. The request may come in the form of a mouse click on a button or menu option, a keyboard stroke or key combination, a verbal command, and so forth. At 702, in response, navigation or contextual information is hidden, preventing on-lookers from inadvertently seeing sensitive or confidential information. At 703, it is determined whether hiding the contextual confirmation has created additional space for the viewing and/or editing of content. If so, at 704, the content region is resized to fit the vacated space. Once that occurs, or if no additional space is available for the content region, the present window shape and location is maintained at 705, at which point the method may terminate normally.

While methods and systems embodying the present invention are shown by way of example, it will be understood that the invention is not limited to these embodiments. The methods and systems described are merely examples of the invention, the limits of which are set forth in the claims which follow. Those skilled in the art may make modifications, particularly in light of the foregoing teachings.

We claim:

1. A computer-implemented method for protecting user interface regions from view on a notebook software application user interface, the method comprising:
   displaying a notebook application user interface, wherein the notebook application user interface includes:
      a predefined menu toolbar,
      a user defined menu toolbar,
      a notebook selection region, wherein the notebook selection region includes a current notebook option and a list of other notebook options,
      a section selection region, wherein the section selection region includes a current section option associated with the current notebook option and a list of other section options associated with the current notebook option,
      a page selection region, wherein the page selection region includes a current page option associated with the current section option and a list of other page options associated with the current section option, and
      a content display region for displaying a current selection associated with the current page option of the current section option of the current notebook option; and
   providing a plurality of protective modes for the notebook application user interface, wherein:
      when a selection of a first protective mode is received, hiding the selectable list of other notebook options, hiding the selectable list of other section options, hiding the selectable list of other page options, maintaining the display of the predefined menu toolbar, maintaining the display of the user defined menu toolbar, maintaining the display of the current notebook option, maintaining the display of the current section option, maintaining the display of the current page option, and maintaining the display of the current selection,
      when a selection of a second protective mode is received, hiding the notebook selection region, hiding the section selection region, hiding the page selection region, maintaining the display of the predefined menu toolbar, maintaining the display of the user defined toolbar and expanding the display of the content display region, and
      when a selection of a third protective mode is received, hiding the predefined menu toolbar, hiding the notebook section region, hiding the section selection region, hiding the page selection region, maintaining the display of the user defined toolbar and expanding the display of the content display region.

2. The computer-implemented method of claim 1, wherein the current notebook option and the list of other notebook options include tab selectors.

3. The computer-implemented method of claim 1, wherein the current section option and the list of other selection options include tab selectors.

4. The computer-implemented method of claim 1, wherein the current page option and the list of other page options include tab selectors.

5. The computer-implemented method of claim 1, wherein the selection of the protective mode is received by at least one member of a group comprising: a notebook application user interface button, a hotkey, and a keyboard shortcut.

6. The computer-implemented method of claim 1, wherein hiding includes removing display data from the notebook application user interface.

7. The computer-implemented method of claim 1, wherein maintaining the display includes maintaining a view of display data on the notebook application user interface.

8. A computer-readable storage medium having computer executable instructions for protecting user interface regions from view on a software application user interface, the instructions comprising:
   displaying an application user interface, wherein the application user interface includes:
      a predefined menu toolbar,
      a user defined menu toolbar,
      a selection region, wherein the selection region includes a current file option and a list of other file options,
      a section selection region, wherein the section selection region includes a current section option associated with the current file option and a list of other section options associated with the current file option,
      a page selection region, wherein the page selection region includes a current page option associated with the current section option and a list of other page options associated with the current section option, and
      a content display region for displaying a current selection associated with the current page option of the current section option of the current file option; and
   providing a plurality of protective modes for the application user interface, wherein:
      when a selection of a first protective mode is received, hiding the selectable list of other file options, hiding the selectable list of other section options, hiding the selectable list of other page options, maintaining the display of the predefined menu toolbar, maintaining the display of the user defined menu toolbar, maintaining the display of the current file option, maintaining the display of the current section option, maintaining the display of the current page option, and maintaining the display of the current selection,
      when a selection of a second protective mode is received, hiding the file selection region, hiding the section selection region, hiding the page selection region, maintaining the display of the predefined menu toolbar, maintaining the display of the user defined toolbar and expanding the display of the content display region, and
      when a selection of a third protective mode is received, hiding the predefined menu toolbar, hiding the section region, hiding the section selection region, hiding the page selection region, maintaining the display of the user defined toolbar and expanding the display of the content display region.

9. The computer-readable storage medium of claim 8, wherein the current file option and the list of other file options include tab selectors.

10. The computer-readable storage medium of claim 8, wherein the current section option and the list of other selection options include tab selectors.

11. The computer-readable storage medium of claim 8, wherein the current page option and the list of other page options include tab selectors.

12. The computer-readable storage medium of claim 8, wherein the selection of the protective mode is received by at least one member of a group comprising: an application user interface button, a hotkey, and a keyboard shortcut.

13. The computer-readable storage medium of claim 8, wherein hiding includes removing display data from the application user interface.

14. The computer-readable storage medium of claim 8, wherein maintaining the display includes maintaining a view of display data on the application user interface.

15. A system for protecting user interface regions from view on a software application user interface, the system comprising:
  a processor; and
  a memory having computer executable instructions stored thereon, wherein the computer executable instructions are configured for:
    displaying an application user interface, wherein the application user interface includes:
      a predefined menu toolbar,
      a user defined menu toolbar,
      a selection region, wherein the selection region includes a current file option and a list of other file options,
      a section selection region, wherein the section selection region includes a current section option associated with the current file option and a list of other section options associated with the current file option,
      a page selection region, wherein the page selection region includes a current page option associated with the current section option and a list of other page options associated with the current section option, and
      a content display region for displaying a current selection associated with the current page option of the current section option of the current file option; and
    providing a plurality of protective modes for the application user interface, wherein:
      when a selection of a first protective mode is received, hiding the selectable list of other file options, hiding the selectable list of other section options, hiding the selectable list of other page options, maintaining the display of the predefined menu toolbar, maintaining the display of the user defined menu toolbar, maintaining the display of the current file option, maintaining the display of the current section option, maintaining the display of the current page option, and maintaining the display of the current selection,
      when a selection of a second protective mode is received, hiding the selection region, hiding the section selection region, hiding the page selection region, maintaining the display of the predefined menu toolbar, maintaining the display of the user defined toolbar and expanding the display of the content display region, and
      when a selection of a third protective mode is received, hiding the predefined menu toolbar, hiding the section region, hiding the section selection region, hiding the page selection region, maintaining the display of the user defined toolbar and expanding the display of the content display region.

16. The system of claim 15, wherein the current file option and the list of other file options include tab selectors.

17. The system of claim 15, wherein the current section option and the list of other selection options include tab selectors.

18. The system of claim 15, wherein the current page option and the list of other page options include tab selectors.

19. The system of claim 15, wherein hiding includes removing display data from the application user interface.

20. The system of claim 15, wherein maintaining the display includes maintaining a view of display data on the application user interface.

* * * * *